US012280482B2

(12) United States Patent
Liu et al.

(10) Patent No.: US 12,280,482 B2

(45) Date of Patent: Apr. 22, 2025

(54) DRIVING DEVICE FOR ELECTRIC NAIL GUN

(71) Applicant: BASSO INDUSTRY CORP., Taichung (TW)

(72) Inventors: An-Gi Liu, Taichung (TW); Chang-Sheng Lin, Taichung (TW); Fu-Ying Huang, Taichung (TW)

(73) Assignee: Basso Industry Corp., Taichung (TW)

( * ) Notice: Subject to any disclaimer, the term of this patent is extended or adjusted under 35 U.S.C. 154(b) by 0 days.

(21) Appl. No.: 18/329,226

(22) Filed: Jun. 5, 2023

(65) Prior Publication Data

US 2024/0131671 A1 Apr. 25, 2024
US 2024/0227145 A9 Jul. 11, 2024

(30) Foreign Application Priority Data

Oct. 25, 2022 (TW) ................................ 111140447

(51) Int. Cl.
*B25C 1/04* (2006.01)

(52) U.S. Cl.
CPC .............. *B25C 1/041* (2013.01); *B25C 1/047* (2013.01)

(58) Field of Classification Search
CPC ........... B25C 1/041; B25C 1/047; B25D 9/08; B25D 9/265; B25D 2250/265; B25D 2250/065; E21B 7/124; B63C 11/52
See application file for complete search history.

(56) References Cited

U.S. PATENT DOCUMENTS

| | | | | |
|---|---|---|---|---|
| 3,661,216 A * | 5/1972 | Yamanaka | B25D 9/08 173/17 |
| 2009/0223691 A1* | 9/2009 | Ikuta | B25D 17/26 173/171 |
| 2019/0022841 A1* | 1/2019 | Kamimoto | B25C 1/047 |
| 2019/0224825 A1* | 7/2019 | Pedicini | B25C 1/06 |
| 2022/0063074 A1 | 3/2022 | Wierzchon et al. | |

FOREIGN PATENT DOCUMENTS

EM 3332916 A2 6/2018

* cited by examiner

*Primary Examiner* — Nathaniel C Chukwurah
(74) *Attorney, Agent, or Firm* — Burris Law, PLLC

(57) ABSTRACT

A driving device for a nail gun includes a striking unit and an air storage unit. The striking unit includes a striking cylinder connected to the nail gun and defining a cylinder chamber having an opening, and a piston disposed in and making an air-tight contact with the striking cylinder. The air storage unit includes an air storage cylinder including a protrusion that protrudes toward the opening and cooperating with the striking cylinder to define an air storage chamber that is in fluid communication with the cylinder chamber via the opening. When the piston moves in a pressure-generating direction, air in the air storage chamber is pressurized. The air storage unit further includes a lubricant disposed in the cylinder chamber and the air storage chamber, and flowing along the protrusion into the cylinder chamber to lubricate the piston.

7 Claims, 7 Drawing Sheets

DRIVING DEVICE FOR ELECTRIC NAIL GUN

CROSS-REFERENCE TO RELATED APPLICATION

This application claims priority to Taiwanese Invention Patent Application No. 111140447, filed on Oct. 25, 2022.

FIELD

The disclosure relates to a driving device, and more particularly to a driving device for an electric pneumatic nail gun.

BACKGROUND

Referring to FIG. 1, a driving mechanism 1 for an electric pneumatic nail gun (not shown) disclosed in U.S. Patent Publication No. 20220063074 includes a cylinder 11, a striking piston 12 that is disposed in and movable in the cylinder 11, and an accumulator piston 13 that is disposed in and movable in the cylinder 11 and that is spaced apart from the striking piston 12, a striking pin 15 that is connected to the striking piston 12 and that is configured to strike a nail (not shown), and a lifting gear 16 that detachably engages the striking pin 15. An air chamber 10 is defined between the cylinder 11 and the accumulator piston 13. The striking piston 12 cooperates with the accumulator piston 13 to define a fluid chamber 14 therebetween and the fluid chamber 14 is filled with a lubricating oil (not shown). The lifting gear 16 drives the striking pin 15 and the striking piston 12 to move toward the accumulator piston 13 so that air in the air chamber 10 is pressurized to generate a pre-load force. When the lifting gear 16 disengages the striking pin 15, the pre-load force drives the accumulator piston 13 to move the striking piston 12 and the striking pin 15 to strike a nail.

The lubricating oil in the fluid chamber 14 lubricates the striking piston 12 that has a reciprocating movement and the accumulator piston 13 in the cylinder 11.

However, in order for the fluid chamber 14 that stores lubricating oil therein to exist, it is necessary to include the accumulator piston 13 in the driving mechanism 1 such as the one disclosed in U.S. Patent Publication No. 20220063074 so as to lubricate movement of the striking piston 12 in the cylinder 11. Additionally, when the lifting gear 16 disengages the striking pin 15 to release the pre-load force, the accumulator piston 13 is first pushed by the pre-load force and then pushes the striking piston 12 and the striking pin 15 to move. This causes kinetic energy loss and adversely affects efficiency of nail-striking.

SUMMARY

Therefore, an object of the disclosure is to provide a driving device for an electric pneumatic nail gun that can alleviate at least one of the drawbacks of the prior art.

According to the disclosure, a driving device adapted for use in an electric pneumatic nail gun is provided. The electric pneumatic nail gun includes a muzzle seat that is disposed for accommodating a nail therein, a nail-striking pin that is mounted in the muzzle seat and that is pneumatically movable along an axis to strike the nail in a striking direction, and a lifting gear that is mounted to the muzzle seat and that is rotatable by electric power to engage the nail-striking pin and to drive the nail-striking pin to move along the axis in a pressure-generating direction opposite to the striking direction. The driving device includes a striking unit and an air storage unit. The striking unit includes a striking cylinder and a piston. The striking cylinder is adapted to be connected to the muzzle seat and has an inner surface that surrounds the axis and that defines a cylinder chamber. The cylinder chamber has an opening that is adapted to be opposite to the muzzle seat along the axis. The piston is disposed in the striking cylinder, makes an air-tight contact with the inner surface, and is adapted to be connected co-movably to the nail-striking pin. The air storage unit includes an air storage cylinder and a lubricant. The air storage cylinder includes an inner wall surface and at least one protrusion. The inner wall surface cooperates with the striking cylinder to define an air storage chamber therebetween. The air storage chamber is in fluid communication with the cylinder chamber via the opening such that, when the piston is moved together with the nail-striking piston in the pressure-generating direction, air in the air storage chamber is pressurized for pushing the piston in the striking direction to drive the nail-striking piston to strike the nail. The protrusion protrudes from the inner wall surface toward the opening. The lubricant is disposed in the cylinder chamber and the air storage chamber, and flows from the inner wall surface along the at least one protrusion onto the inner surface via the opening to lubricate movement of the piston.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
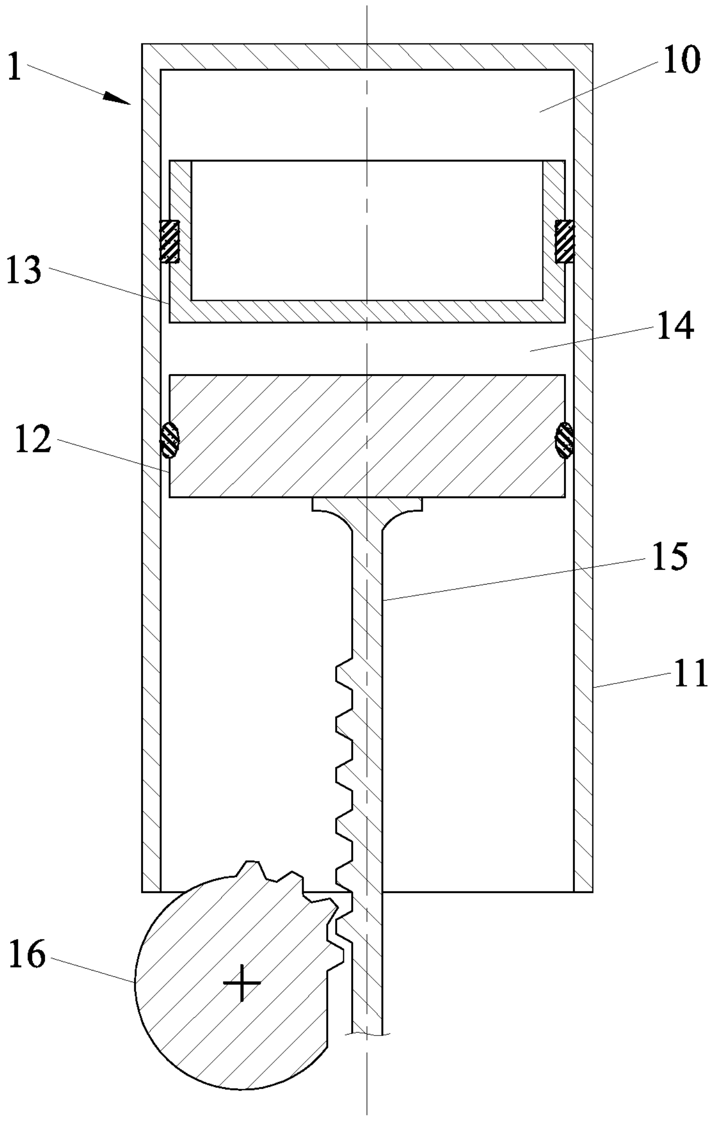
FIG.1 PRIOR ART
FIG. 1 is a fragmentary sectional view of a driving mechanism for an electric pneumatic nail gun disclosed in U.S. Patent Publication No. 20220063074.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
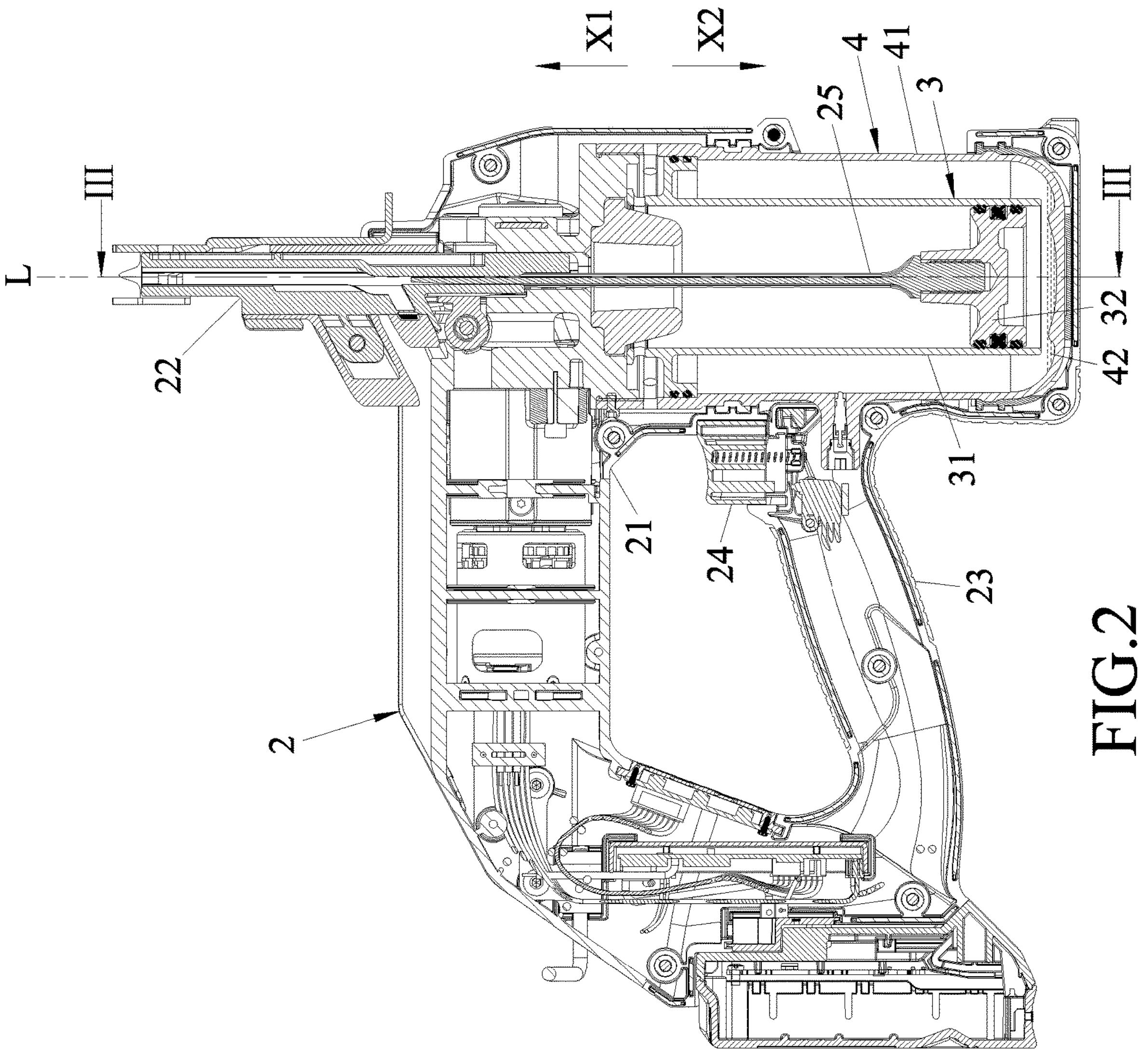
FIG. 2 is a sectional view of a driving device of an embodiment according to the present disclosure being mounted in an electric pneumatic nail gun.
Figure 3:
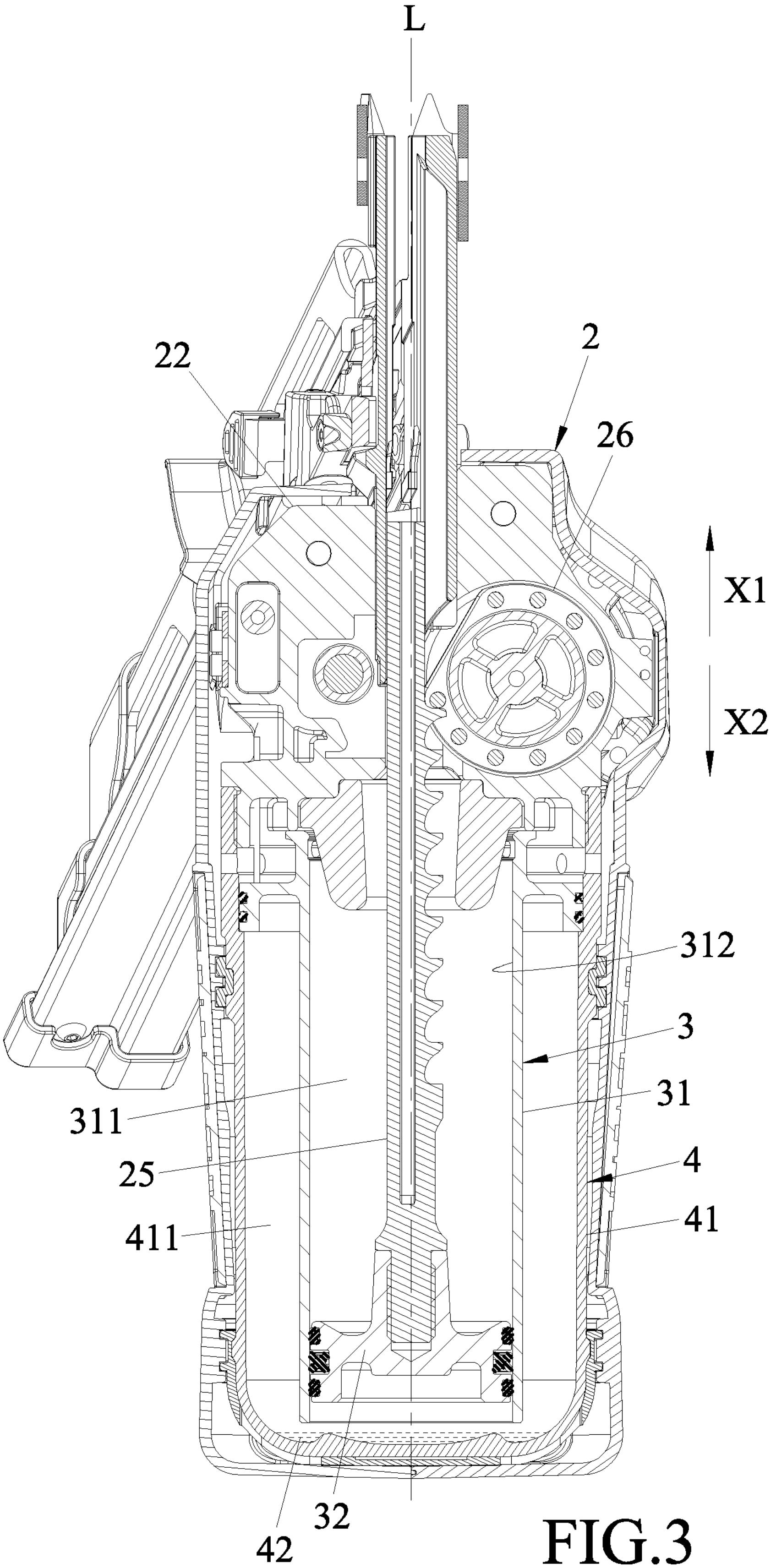
FIG. 3 is a sectional view taken along line III-III in FIG. 2.
Figure 4:
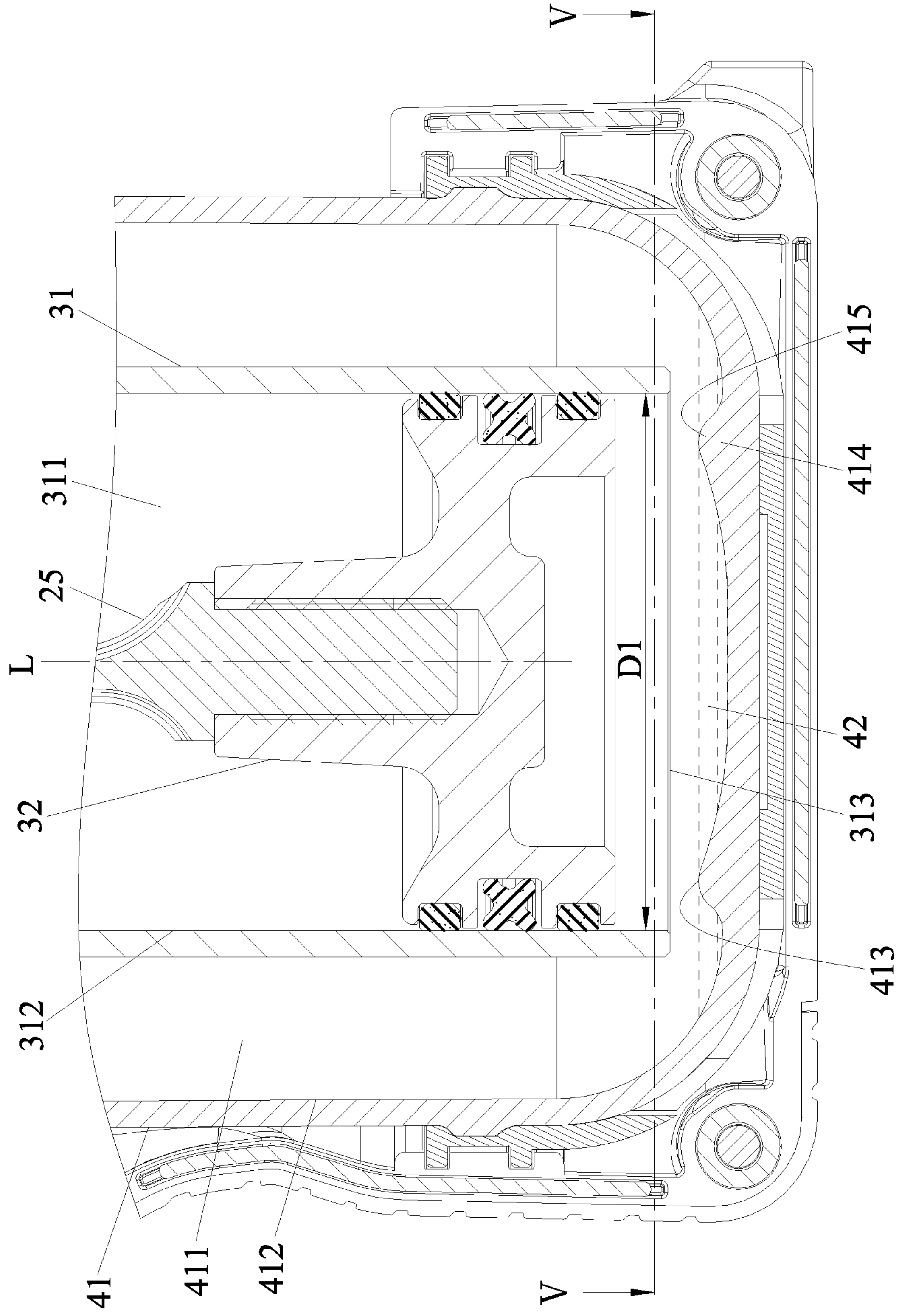
FIG. 4 is a fragmentary partly enlarged view of FIG. 2.

Referring to FIGS. 2, 3 and 4, a driving device of an embodiment according to the present disclosure is adapted for use in an electric pneumatic nail gun 2. The electric pneumatic nail gun 2 includes a main body 21, a muzzle seat 22 that is connected to the main body 21 and that is disposed for accommodating a nail (not shown) therein, a handle 23 that is connected to the main body 21 for holding the electric pneumatic nail gun 2, an actuating unit 24 that is disposed on the handle 23 and that is operable to start a striking cycle (to be described in further detail later), a nail-striking pin 25 that is mounted in the muzzle seat 22 and that is pneumatically movable along an axis (L) to strike the nail in a striking direction (X1), and a lifting gear 26 that is disposed rotatably on the muzzle seat 22 and that detachably engages the nail-striking pin 25. The lifting gear 26 is driven by electric power, e.g., generated by a motor (not shown), to drive the nail-striking pin 25 to move in a pressure-generating direction (X2) opposite to the nail-striking direction (X1).

The driving device includes a striking unit 3 that is mounted to the muzzle seat 22, and an air storage unit 4 that receives the striking unit 3 therein.

The striking unit 3 includes a striking cylinder 31 that is adapted to be connected to the muzzle seat 22, and a piston 32 that is disposed in the striking cylinder 31 and that is adapted to be connected co-movably to the nail-striking pin 25.

The striking cylinder 31 has an inner surface 312 that surrounds the axis (L) and that defines a cylinder chamber 311. The cylinder chamber 311 has an opening 313 that is adapted to be opposite to the muzzle seat 22 along the axis (L).

The piston 32 makes an airtight contact with the inner surface 312 and is movable in the cylinder chamber 311 along the axis (L) such that the cylinder chamber 311 is divided by the piston 32 into an upper portion and a lower portion that are variable in volume according to the position of the piston 32.

The air storage unit 4 includes an air storage cylinder 41 and a lubricant 42.

Figure 5:
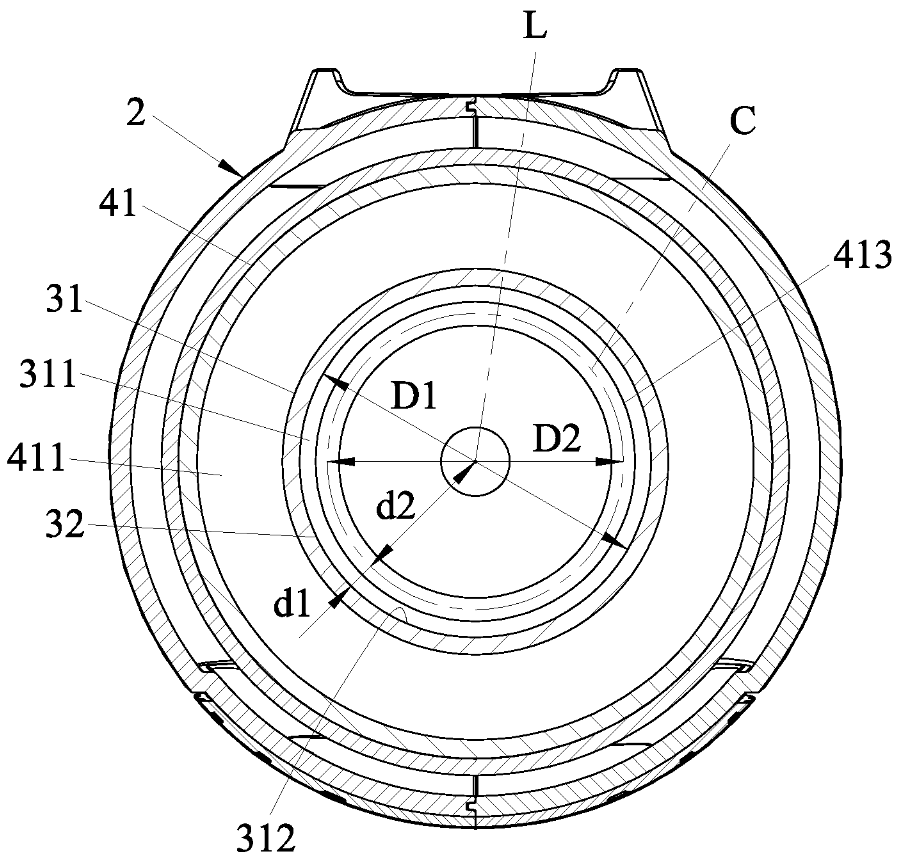
FIG. 5 is a sectional view taken along the line V-V in FIG. 4.

The air storage cylinder 41 includes an inner wall surface 412 and a protrusion 413. The inner wall surface 412 of the air storage cylinder 41 cooperates with the striking cylinder 31 to define an air storage chamber 411 therebetween. The protrusion 413 protrudes from the inner wall surface 412 toward the opening 313. The air storage chamber 411 is in fluid communication with the lower portion of the cylinder chamber 311 via the opening 313 such that when the piston 32 is moved together with the nail-striking pin 25 in the pressure-generating direction (X2), a volume of the lower portion of the cylinder chamber 311 is reduced, and air in the lower portion of the cylinder chamber 311 and the air storage chamber 411 is pressurized for pushing the piston 32 in the striking direction (X1) to drive the nail-striking pin 25 to strike the nail. Further referring to FIG. 5, the protrusion 413 extends along an annular path (C) that extends around the axis (L). The protrusion 413 has a wave-shaped cross-section along the axis (L), and includes a base portion 414 protruding from the inner wall surface 412, and a crest portion 415 extending from the base portion 414 and tapering toward the opening 313. The crest portion 415 has a cross sectional area smaller than that of the base portion 414. The annular path (C) has a maximum diameter (D2) in a radial direction perpendicular to the axis (L) that is smaller than a caliber (D1) of the opening 313 of the cylinder chamber 311 in the radial direction. A first distance (d1) in the radial direction between the annular path (C) and the inner surface 312 is smaller than a second distance (d2) in the radial direction between the axis (L) and the annular path (C). In this embodiment, a ratio of the first distance (d1) to the second distance (d2) ranges from 1:5 to 1:6.

It should be noted that, the striking cycle stated above refers to a period from the time that the actuating unit 24 enables the electric power (from the motor) to drive the lifting gear 26 to move the nail-striking pin 25 in the pressure-generating direction (X2) until the time that the nail-striking pin 25 strikes the nail in the striking direction (X1) to complete a nail-striking operation. Generally, the air storage chamber 411 is not in fluid communication with the external environment during the striking cycle. In fact, only if the air pressure in the air storage chamber 411 (and the lower portion of the cylinder chamber 311) drops below a predetermined threshold, will the air storage chamber 411 that is connected to an external air source (not shown) begin to supply air into the air storage chamber 411 until the air pressure therein is equal to or larger than the predetermined threshold.

In this embodiment, the lubricant 42 is a lubricating oil, is disposed in the lower portion of the cylinder chamber 311 and the air storage chamber 411, and flows from the inner wall surface 412 along the protrusion 413 onto the inner surface 312 via the opening 313 to lubricate movement of the piston 32.

It should be noted that the lubricant 42 is injected into the air storage chamber 411 in advance, and may be supplemented during maintenance of the driving device. For example, an amount of the lubricant 42 that should be injected into the air storage chamber 411 is about 4 cc per maintenance.

As shown in FIGS. 2 and 3, when the actuating unit 24 is operated by a user to perform the nail-striking operation and to start a striking cycle, the lifting gear 26 engages the nail-striking pin 25 and moves the nail-striking pin 25 in the pressure-generating direction (X2) to a nail-striking position away from the muzzle seat 22 shown in FIG. 2. At this position, the piston 32 compresses the air in the air storage chamber 411 and the lower portion of the cylinder chamber 311 to generate an air pressure equal to or larger than the predetermined threshold. When the lifting gear 26 is rotated and disengages from the nail-striking pin 25, the piston 32 is pushed by the air pressure in the nail-striking direction (X1) and the nail-striking pin 25 is co-movable therewith and is directly driven by the air pressure to slide along the muzzle seat 22 to strike the nail, so that the nail-striking pin 25 is moved to a position proximate to the muzzle seat 22, thereby completing the nail-striking operation.

After the nail-striking operation is completed, the lifting gear 26 may be rotated by the electric power and engages the nail-striking pin 25 again so as to drive movement of the nail-striking pin 25 and the piston 32 in the pressure-generating direction (X2) to the nail-striking position shown in FIG. 2. Similarly, the volume of the lower portion of the cylinder chamber 311 and the air storage chamber 411 is reduced and the air stored therein is pressurized for pushing the piston 32 in the striking direction (X1) to drive the nail-striking pin 25 to strike another nail in a next striking cycle. By repeating the abovementioned procedure, the function of a pneumatic nail-striking operation using pressurized air while generating pressure with electric power may be achieved.

During operation of the electric pneumatic nail gun 2 by the user, as shown in FIG. 2, when the muzzle seat 22 faces upwardly to strike the nail, the lubricant 42 in the air storage chamber 411 accumulates on the inner wall surface 412 at a position corresponding to the striking cylinder 31. On the other hand, as shown in FIG. 6, when the muzzle seat 22 is turned downwardly, by virtue of surface tension and the Coanda effect, the lubricant 42 that is disposed on the inner wall surface 412 tends to flow from the inner wall surface 412 along the base portion 414 of the protrusion 413 to the crest portion 415 of the protrusion 413 and to drop into the cylinder chamber 311 through the opening 313.

Figure 6:
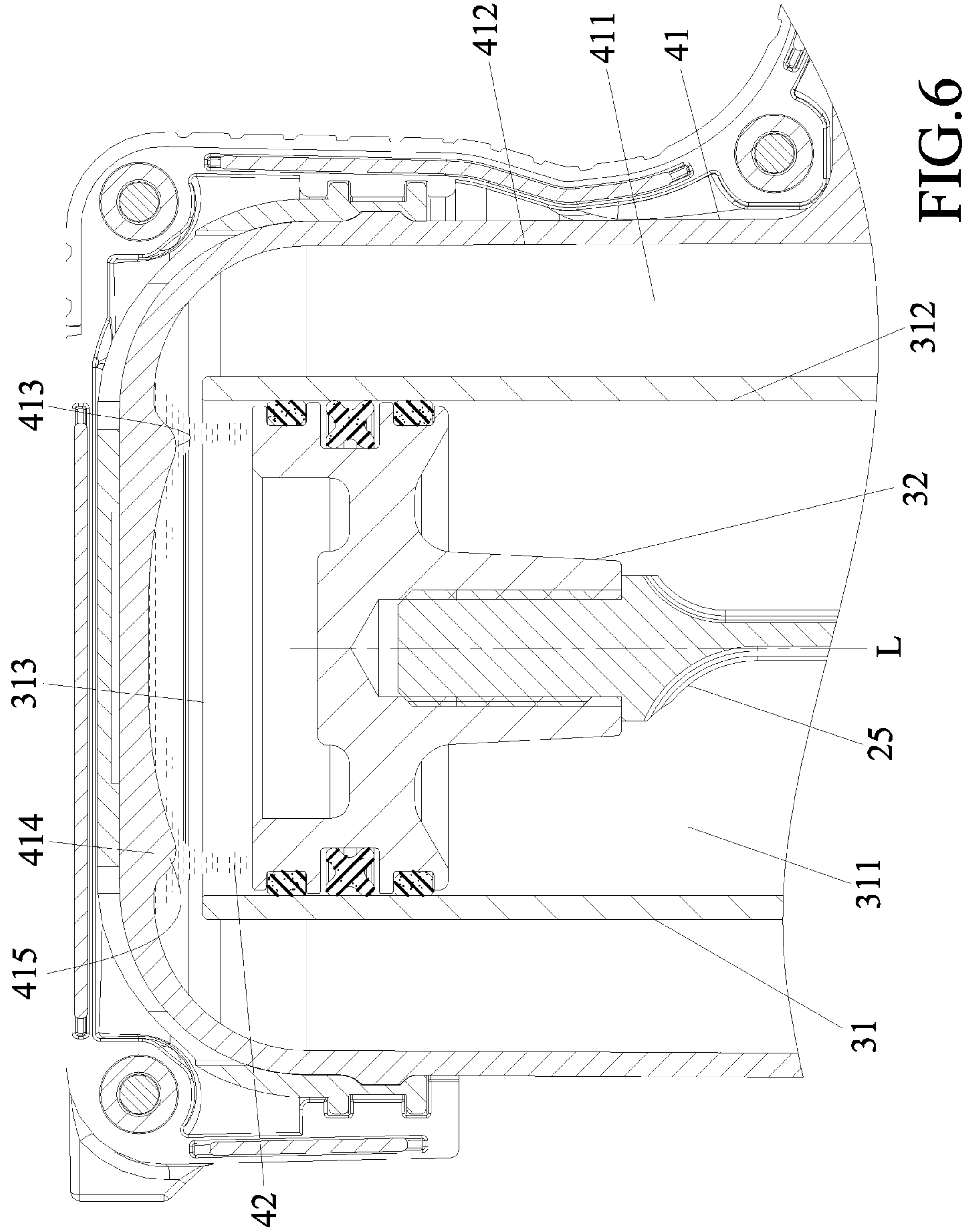
FIG. 6 is a fragmentary partly enlarged view similar to FIG. 4, but illustrating the electric pneumatic nail gun being turned up-side down.

As shown in FIG. 6, since the crest portion 415 of the protrusion 413 is adjacent to the inner surface 312 of the striking cylinder 31 in the radial direction, the lubricant 42 flowing into the cylinder chamber 311 tends to flow onto the inner surface 312 to lubricate movement of the piston 32 that makes air-tight contact with the inner surface 312. In this way, the piston 32 and the inner surface 312 are lubricated to reduce frictional force therebetween. In particular, when the piston 32 moves in the pressure-generating direction (X2) to compress the air, the lubricant 42 flows over and lubricates a portion of the inner surface 312 located in the lower portion of the cylinder chamber 311 so that the piston 32 may be smoothly moved in the pressure-generating direction (X2) to pressurize air in the air storage chamber 411.

Figure 7:
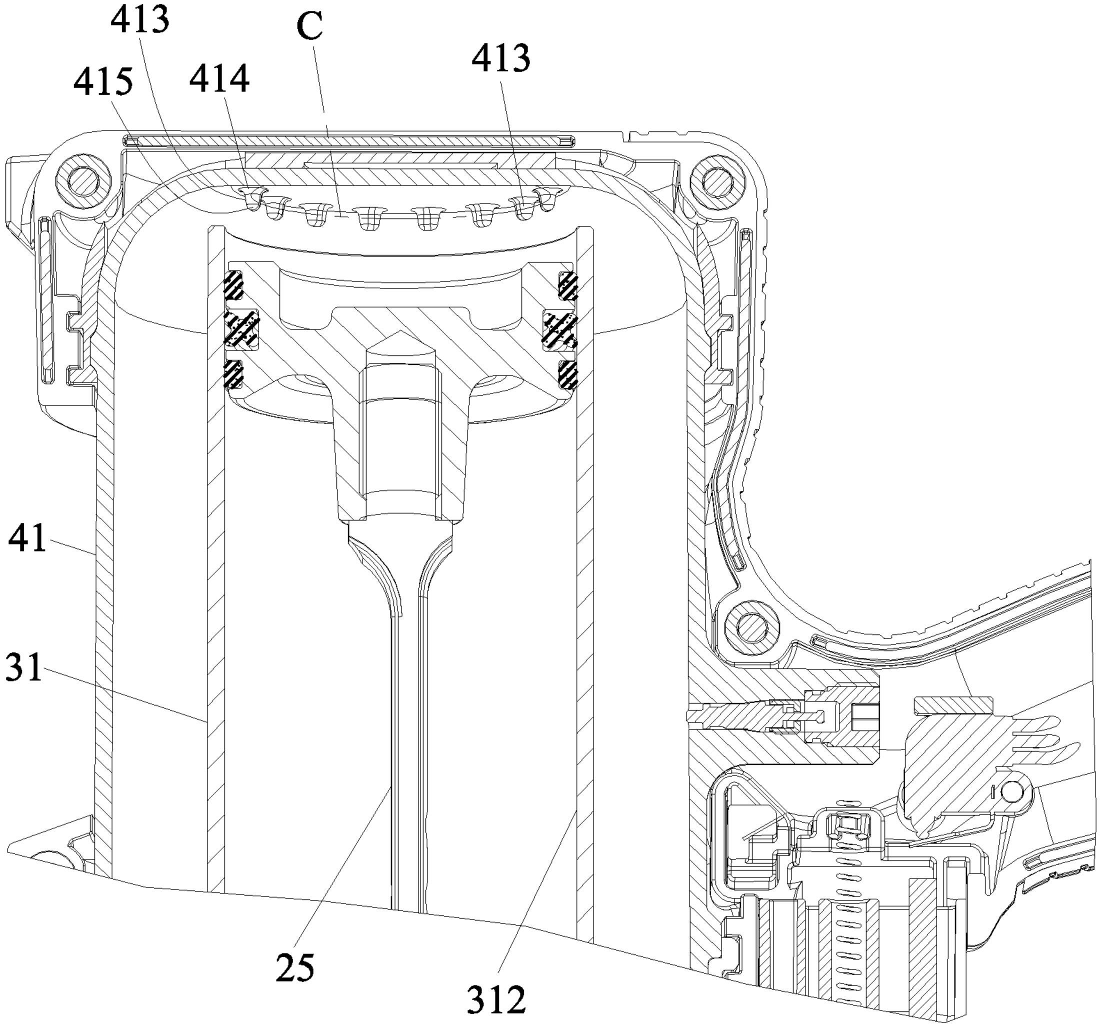
FIG. 7 is a fragmentary partly enlarged sectional view similar to FIG. 6, but illustrating a modification of the embodiment that includes a plurality of protrusions.

It should be noted that the number of the protrusion 413 is not limited to one. Referring to FIG. 7, a modification of the driving device of the embodiment is shown. Specifically, in this modification, a plurality of protrusions 413 are spaced apart from each other along the annular path (C). Similarly, the lubricant 42 may also be guided by the crest portion 415 of each of the protrusions 413 to flow into the cylinder chamber 311 and onto the inner surface 312 to lubricate movement of the piston 32.

Through the above description, the advantages of the embodiment of the present disclosure may be summarized as follows:

In the present disclosure, by virtue of the protrusion 413 that guides the lubricant 42 to flow onto the inner surface 312, a relatively smooth movement of the piston 32 relative to the inner surface 312 may be achieved and wear to the piston 32 and the inner surface 312 may be reduced to thereby prolong service life of the driving device of the present disclosure and the electric pneumatic nail gun mounted therewith. Furthermore, with the smooth piston 32 movement, additional elements such as an accumulator piston disclosed in U.S. Patent Publication No. 20220063074 or altering the design of the piston 32 will not be necessary. Finally, since the nail-striking pin 25 is directly driven by the pressurized air, a relatively efficient nail-striking operation without kinetic energy loss may also be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A driving device adapted for use in an electric pneumatic nail gun, the electric pneumatic nail gun including a muzzle seat that is disposed for accommodating a nail therein, a nail-striking pin that is mounted in the muzzle seat and that is pneumatically movable along an axis to strike the nail in a striking direction, and a lifting gear that is mounted to the muzzle seat, and that is rotatable by electric power to engage the nail-striking pin and to drive the nail-striking pin to move along the axis in a pressure-generating direction opposite to the striking direction, said driving device comprising:

- a striking unit that includes
  - a striking cylinder adapted to be connected to the muzzle seat, and having an inner surface that surrounds the axis and that defines a cylinder chamber, said cylinder chamber having an opening that is adapted to be opposite to the muzzle seat along the axis, and
  - a piston disposed in said striking cylinder, making an air-tight contact with said inner surface, and adapted to be connected co-movably to the nail-striking pin;
- an air storage unit that includes
  - an air storage cylinder including
    - an inner wall surface that cooperates with said striking cylinder to define an air storage chamber therebetween, said air storage chamber being in fluid communication with said cylinder chamber via said opening such that, when said piston is moved together with the nail-striking pin in the pressure-generating direction, air in said air storage chamber is pressurized for pushing said piston in the striking direction to drive the nail-striking pin to strike the nail, and
    - at least one protrusion that protrudes from said inner wall surface toward said opening; and
  - a lubricant disposed in said cylinder chamber and said air storage chamber, and flowing from said inner wall surface along said at least one protrusion onto said inner surface via said opening to lubricate movement of said piston;
  - wherein said at least one protrusion has a wave-shaped cross-section along the axis, and includes a base portion protruding from said inner wall surface and a crest portion extending from said base portion and tapering toward said opening.

2. The driving device as claimed in claim 1, wherein said at least one protrusion includes one protrusion extending along an annular path that extends around the axis and that has a maximum diameter in a radial direction perpendicular to the axis which is smaller than a caliber of said opening of said cylinder chamber in the radial direction.

3. The driving device as claimed in claim 2, wherein a first distance in the radial direction between said annular path and said inner surface of said striking cylinder is smaller than a second distance in the radial direction between the axis and said annular path.

4. The driving device as claimed in claim 3, wherein a ratio of the first distance to the second distance ranges from 1:5 to 1:6.

5. The driving device as claimed in claim 1, wherein said at least one protrusion includes a plurality of protrusions spaced apart from each other along an annular path that extends around the axis and that has a maximum diameter in a radial direction perpendicular to the axis and smaller than a caliber of said opening of said cylinder chamber in the radial direction.

6. The driving device as claimed in claim 5, wherein a first distance in the radial direction between said annular path and said inner surface of said striking cylinder is smaller than a second distance in the radial direction between the axis and said annular path.

7. The driving device as claimed in claim 6, wherein a ratio of the first distance to the second distance ranges from 1:5 to 1:6.

* * * * *